United States Patent
Cochin et al.

(10) Patent No.: US 11,829,304 B2
(45) Date of Patent: *Nov. 28, 2023

(54) PAIRING OF EXTERNAL DEVICE WITH RANDOM USER ACTION

(71) Applicant: McAfee, LLC, Plano, TX (US)

(72) Inventors: Cedric Cochin, Portland, OR (US); Jonathan Edwards, Portland, OR (US); Aditya Kapoor, Beaverton, OR (US)

(73) Assignee: MCAFEE, LLC, San Jose, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 15/851,399

(22) Filed: Dec. 21, 2017

(65) Prior Publication Data
US 2018/0113819 A1   Apr. 26, 2018

Related U.S. Application Data

(63) Continuation of application No. 14/579,689, filed on Dec. 22, 2014, now Pat. No. 9,852,086.

(51) Int. Cl.
*G06F 13/12* (2006.01)
*H04W 12/04* (2021.01)
(Continued)

(52) U.S. Cl.
CPC .......... *G06F 13/126* (2013.01); *G06F 9/4411* (2013.01); *G06F 13/385* (2013.01); *G06F 21/35* (2013.01); *G06F 21/44* (2013.01); *G06F 21/445* (2013.01); *G06F 21/566* (2013.01); *G06F 21/85* (2013.01); *H04W 12/04* (2013.01);
(Continued)

(58) Field of Classification Search
None
See application file for complete search history.

(56) References Cited

U.S. PATENT DOCUMENTS 7,629,963 B1 * 12/2009 Wright .................. G06F 9/453
345/168
8,787,899 B2   7/2014 Parkkinen et al.
(Continued)

FOREIGN PATENT DOCUMENTS

CN   103581900   2/2014
EP   3238127    12/2019

OTHER PUBLICATIONS

Kingsley-Hughes, Adrian ("Hardware 2.0: Bring Your Own Device", Jul. 30, 2013) https://www.zdnet.com/article/usb-flash-drives-masquerading-as-keyboards-mean-more-byod-security-headaches/.*

International Searching Authority, "International Search Report", issued in connection with PCT Application No. PCT/US2015/062624, dated Apr. 8, 2016, 12 pages.

European Patent Office, "Extended European Search Report," issued in connection with European Patent Application No. 158374033.2, dated Jun. 15, 2018, 10 pages.

(Continued)

*Primary Examiner* — Idriss N Alrobaye
*Assistant Examiner* — Dayton Lewis-Taylor
(74) *Attorney, Agent, or Firm* — HANLEY, FLIGHT & ZIMMERMAN, LLC

(57) ABSTRACT

Pairing of an external device using a random user action is disclosed herein. An example method includes restricting the external device from accessing a resource. A user input receivable from the external device is identified based on a type of the external device, the user input not included in a list of previously generated user actions. In response to receipt of the user input from the external device within a threshold time period, the external device is authorized to access the resource.

21 Claims, 10 Drawing Sheets

(51) Int. Cl.
    *G06F 9/44*     (2018.01)
    *G06F 21/44*     (2013.01)
    *G06F 21/35*     (2013.01)
    *G06F 13/38*     (2006.01)
    *G06F 9/4401*     (2018.01)
    *G06F 21/56*     (2013.01)
    *G06F 21/85*     (2013.01)
    *H04W 12/06*     (2021.01)
    *H04W 12/50*     (2021.01)
    *G06F 21/53*     (2013.01)
    *H04W 12/61*     (2021.01)
    *H04W 12/68*     (2021.01)

(52) U.S. Cl.
    CPC ........... *H04W 12/06* (2013.01); *H04W 12/50* (2021.01); *G06F 21/53* (2013.01); *H04W 12/61* (2021.01); *H04W 12/68* (2021.01)

(56) References Cited

U.S. PATENT DOCUMENTS

| | | | |
|---|---|---|---|
| 8,813,188 B2 | 8/2014 | Vauclair | |
| 9,852,086 B2 | 12/2017 | Cochin et al. | |
| 2006/0105712 A1* | 5/2006 | Glass | G06F 21/35 455/41.2 |
| 2007/0271353 A1 | 11/2007 | Manchester et al. | |
| 2007/0300063 A1* | 12/2007 | Adams | G06F 21/35 713/168 |
| 2011/0113485 A1 | 5/2011 | Little et al. | |
| 2011/0119491 A1 | 5/2011 | Nocera | |
| 2012/0005632 A1* | 1/2012 | Broyles, III | G06F 3/017 715/863 |
| 2012/0156993 A1 | 6/2012 | Seo et al. | |
| 2012/0254987 A1 | 10/2012 | Ge et al. | |
| 2013/0031275 A1 | 1/2013 | Hanes | |
| 2014/0364060 A1 | 12/2014 | Srivatsa et al. | |

OTHER PUBLICATIONS

European Patent Office, "Supplemental European Search Report," issued in connection with European Patent Application No. 158374033.2, dated Jul. 3, 2018, 1 page.

"BadUSB," Exploit Makes Devices Turn "Evil"—Slashdot, Dec. 21, 2014 retrieved from the internet: https//it.slashdot.org/story/14/07/31/149205/badusb-exploit-makes-devices-turn-evil#comments, 80 pages.

United States Patent and Trademark Office, "Non-final Office Action," issued in connection with U.S. Appl. No. 14/579,689, dated May 2, 2017, 29 pages.

United States Patent and Trademark Office, "Notice of Allowance," issued in connection with U.S. Appl. No. 14/579,689, dated Aug. 24, 2017, 9 pages.

International Bureau, "International Preliminary Report on Patentability," issued in connection with International Application No. PCT/US2015/062624, dated Jul. 6, 2017, 9 pages.

United States Patent and Trademark Office, "Notice of Allowance and Fees Due," issued in connection with U.S. Appl. No. 14/579,689, dated Aug. 24, 2017, 9 pages.

The China National Intellectual Property Administration, "First Office Action," issued in connection with Chinese Patent Application No. 201580075489.1, dated Sep. 4, 2019, 10 pages.

The China National Intellectual Property Administration, "Notice of Allowance," issued in connection with Chinese Patent Application No. 201580075489.1, dated Jul. 24, 2020, 3 pages.

European Patent Office, "Intent to Grant," issued in connection with European Patent Application No. 15874033.2, dated Jun. 27, 2019, 44 pages.

European Patent Office, "Decision to Grant" issued in connection with European Patent Application No. 15874033.2, dated Nov. 28, 2019, 1 page.

* cited by examiner

PAIRING OF EXTERNAL DEVICE WITH RANDOM USER ACTION

RELATED APPLICATIONS

This patent arises from a continuation of U.S. patent application Ser. No. 14/579,689, filed on Dec. 22, 2014, and entitled "PAIRING OF EXTERNAL DEVICE WITH RANDOM USER ACTION." Priority to U.S. patent application Ser. No. 14/579,689 is claimed. U.S. patent application Ser. No. 14/579,689 is hereby incorporated herein by reference in its entirety.

BACKGROUND

Electronic devices such as computers have the ability to interface with many other devices. For example, a user may connect input devices, such as keyboards, or storage devices, such as thumb drives, to a computer. However, some devices may contain malicious software, such as malware or viruses, that may compromise a user's computer. Preventing malicious actions by some devices but enabling the use of safe devices with a user's computer may be challenging. Moreover, users may be reluctant to perform time-consuming or complicated actions to validate unknown devices to ensure they do not contain malicious software.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
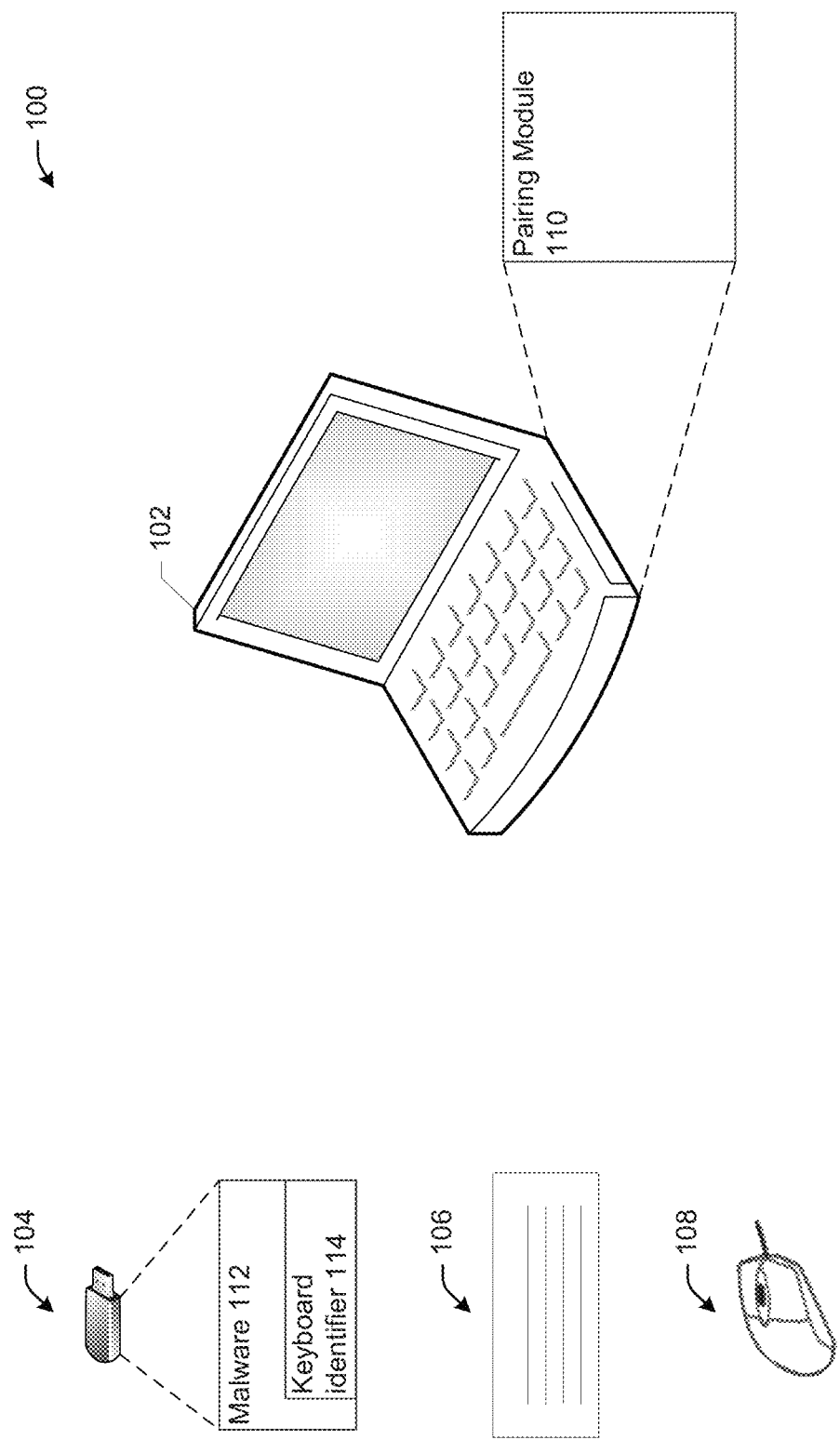
FIG. 1 is a schematic diagram of a system having a computer and external devices in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments herein relate to pairing an external device and a computer using a random user action. The random user action may be generated based on the type of device, thus preventing attacks by malicious devices or malicious software that misidentifies the external device. In some embodiments, an external device may be connected to a computer via a wired interface (e.g., USB) or a wireless interface (e.g., Bluetooth). The external device may include an identifier that identifies the device. The connection of the external device to the computer may be detected, and the type of device may be determined from the identifier provided by the external device. The external device may be segregated from one or more resources of the computer. For example, the external device may be unable to access one or more resources of the computer until a pairing is completed successfully.

A random user action based on the type of device may be generated. For example, if the device type is a keyboard, the random user action may be a sequence of keystrokes. If the device type is a mouse, the random user action may be a sequence of button clicks. The random user action may be requested from the external device, such as by providing a visual notification with user instructions (e.g., a time period to perform the random user action). If the random user action is received from the external device, the external device may be paired with the computer, and provided access to the one or more resources of the computer. For example, a user may input keystrokes on a keyboard to perform the random user action received by the computer. If the random user action is not received from the external device, the external device may be rejected and may not be paired with the computer. For example, if the random user action is not received from the device with the time period specified to perform the user action, the external device may be rejected and not paired with the computer. In some embodiments, if a different random user action that does not match the requested random user action is received from the external device, the external device may be rejected.

FIGS. 1-7 depict a system 100 illustrating a computer 102 and various external devices 104, 106, and 108 that may be connected to the computer 102 via various interfaces. The computer 102 may be a laptop computer, a desktop computer, a tablet computer, a smartphone, a personal digital assistant, a wearable computer, a server, or other suitable computers having an interface for connecting external devices.

As shown in FIG. 1, the external devices may include, for example, a flash drive 104 (also referred to as a "thumb drive"), a keyboard 106, and a mouse 108. In other embodiments, the techniques described herein may be used with other devices, such as cameras (e.g., webcams), microphones, gaming controllers (e.g., gamepads, joysticks, etc.), trackballs, foot pedals, head-mounted displays, portable hard drives, portable DVD drives, printers, scanners, all-in-ones, and other suitable devices.

The computer 102 may include various wired and wireless interfaces for connecting external devices, such as flash drive 104, keyboard 106, and mouse 108. For example, such interfaces may include, for example, universal serial bus (USB), Firewire (IEEE-1394), Thunderbolt, Lighting, Dockport, or other suitable interfaces. In some embodiments, interfaces may include networking interfaces using wired Ethernet, wireless Ethernet (Wi-Fi), or other technologies. In some embodiments, wireless interfaces may include Bluetooth, Near Field Communication (NFC), or other suitable wireless interfaces.

The computer 102 may include a pairing module 110 executable by one or more processors of the computer 102. As described further below, the pairing module 110 may detect connection of an external device, determine a type of the connected device, and generate a random user action associated with the device to complete a pairing between the computer 102 and the external device. In some embodiments, the pairing module 110 may be implemented in an operating system (OS) driver for an interface (e.g., a USB driver for a USB interface).

In some instances, an external device may include malicious software (also referred to as "malware"). Malicious software may include, for example, viruses, worms, Trojans, spyware, ransomware, adware, scareware, and other malicious programs. Malware may, in some devices, misidentify the device to enable malicious actions to be sent to and performed by the computer 102 after the device is connected. In some instances, malicious devices disguised as legitimate external devices may be obtained and distributed to users with the intent to compromise a user's computer. In such instances, the malicious devices may physically appear be a non-input capable device (e.g., a flash drive) that may misidentify itself to a computer as an input device (e.g., a keyboard). After the malicious device is connected to the computer, inputs (e.g., keystrokes) may be input to the computer to perform malicious actions, such as to download malicious software, disable antivirus software, disable firewalls, open back doors, etc. A malicious device may identify itself as multiple devices. For example, a malicious device masquerading as a flash drive may identify itself as, and enable the functionality of, a flash drive, and may also identify itself as a keyboard to enable malicious inputs to a computer after connection. In some instances, legitimate devices may be reprogrammed to include malicious software. For example, a flash drive purchased from a legitimate retailer may be reprogrammed by malicious software when connected to an infected computer.

For example, as shown in FIG. 1, the flash drive 104 may include malicious software ("malware") 112 stored on a memory of the flash drive 104. In the example, shown in FIG. 1, the malware 112 may misidentify the flash drive 104 as a keyboard via identifier 114. In some embodiments, the malware 112 may be "BadUSB." As described above, in some embodiments, the flash drive 104 may also include another identifier that identifies it as a flash drive.

Figure 2:
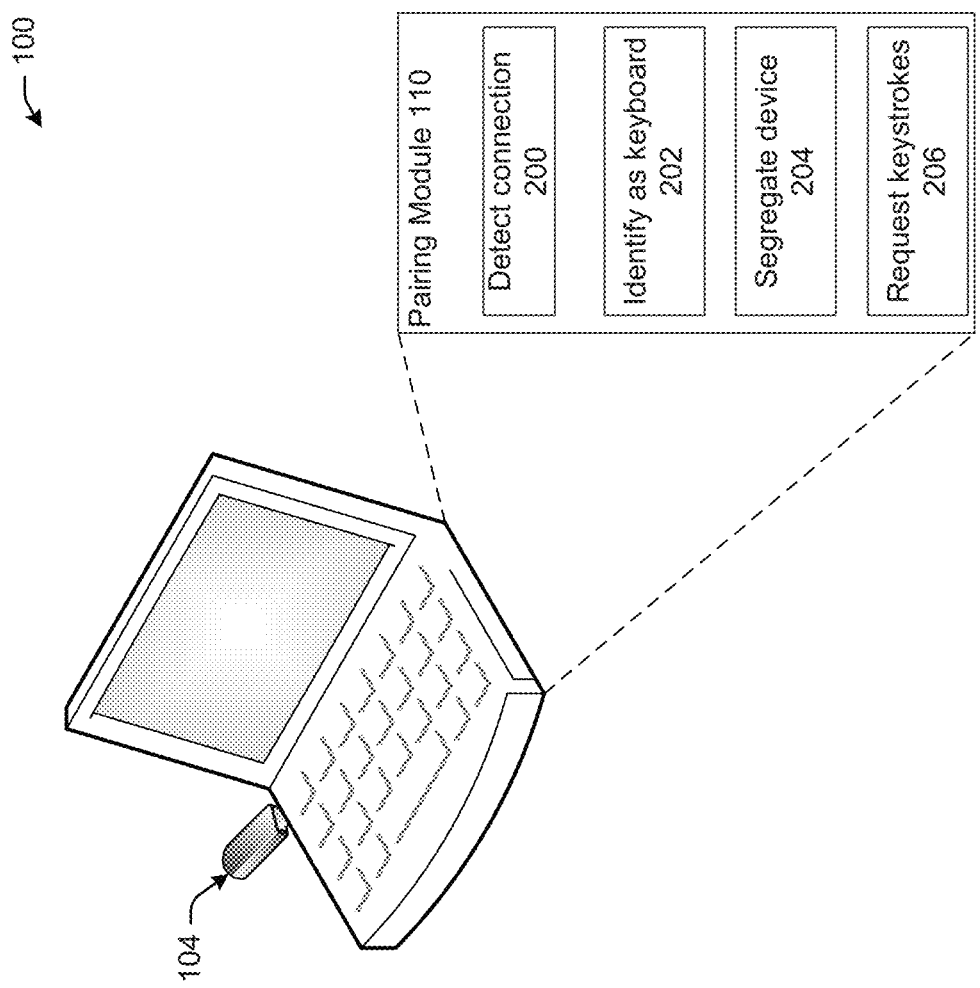
FIGS. 2 and 3 are schematic diagrams depicting connection of a flash drive to the computer of FIG. 1 in accordance with an embodiment of the disclosure.

FIG. 2 depicts connection of the flash drive 104 to the computer 102. As shown in FIG. 2, the flash drive 104 may be connected via a wired interface, such as a USB interface. For example, if the computer 102 is a laptop computer, the flash drive 104 may be inserted into a USB port on the laptop. Upon connection to the computer 102, the pairing module 110 may detect connection of the flash drive 104 (block 200) and determine the type of device (block 202). In the embodiments depicted in FIG. 2, the pairing module 110 may determine that the flash drive 104 is a keyboard, as provided by the keyboard identifier 114 stored on the flash drive 104.

The flash drive 104 may then be segregated from the resources of the computer 102 (block 204) and may only interact with the pairing module 110. Such resources may include resources of the operating system executed on the computer 102, hardware of the computer 102, other applications executing on the computer 102, and so on. The pairing module 110 may then generate and request a random user action based on the device type to be performed using the device. For example, because the flash drive 104 is identified as a keyboard, the random user action may be a sequence of keystrokes. Thus, the pairing module 110 may generate and request a sequence of keystrokes to be performed using the connected flash drive 104 (block 206).

Figure 3:
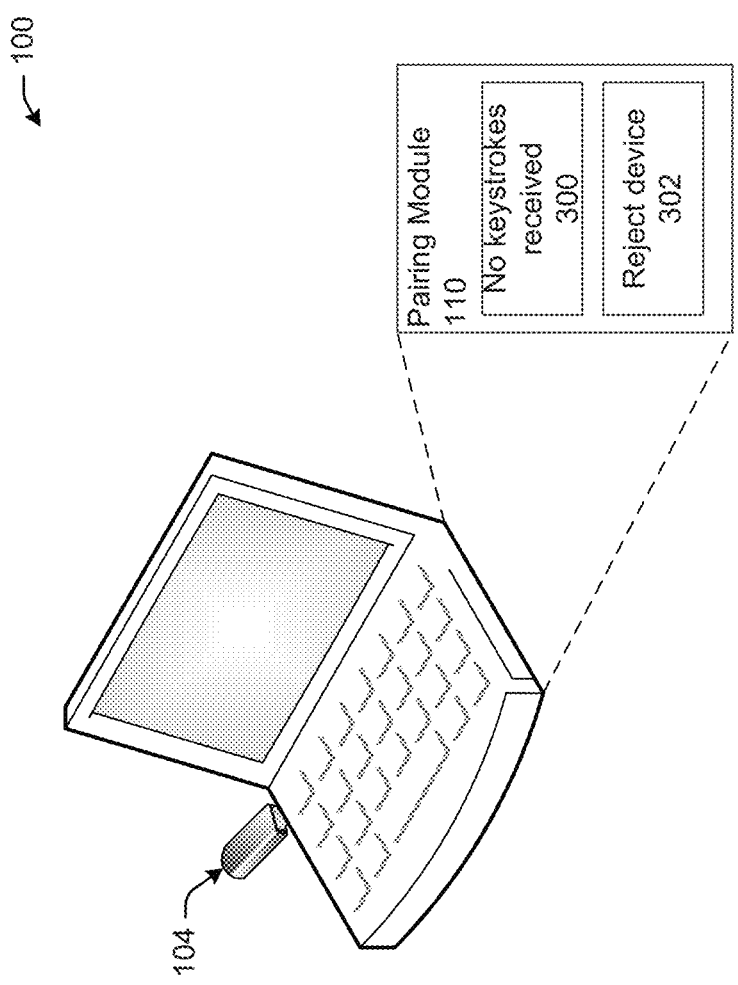

Consequently, in the embodiment depicted in FIGS. 2 and 3, a user is unable to enter the requested keystrokes using the flash drive 104. As a result, as shown in FIG. 3, no keyboard input is received (block 300) from the connected device. The flash drive 104 is then rejected and is not paired with the computer 102 (block 302). Although the malicious software may attempt to input keystrokes, the malicious software is unlikely to send the requested keystrokes to the computer 102. In some embodiments, the flash drive 104 may be rejected if the requested keystrokes are not received in a time period (or the pairing is canceled by a user). In some embodiments, the flash drive 104 may be rejected if any keystrokes received from the flash drive 104 do not match the requested keystrokes. Consequently, the malicious software on the flash drive 104 is unable to instruct the computer 102 to perform malicious actions.

Figure 4:
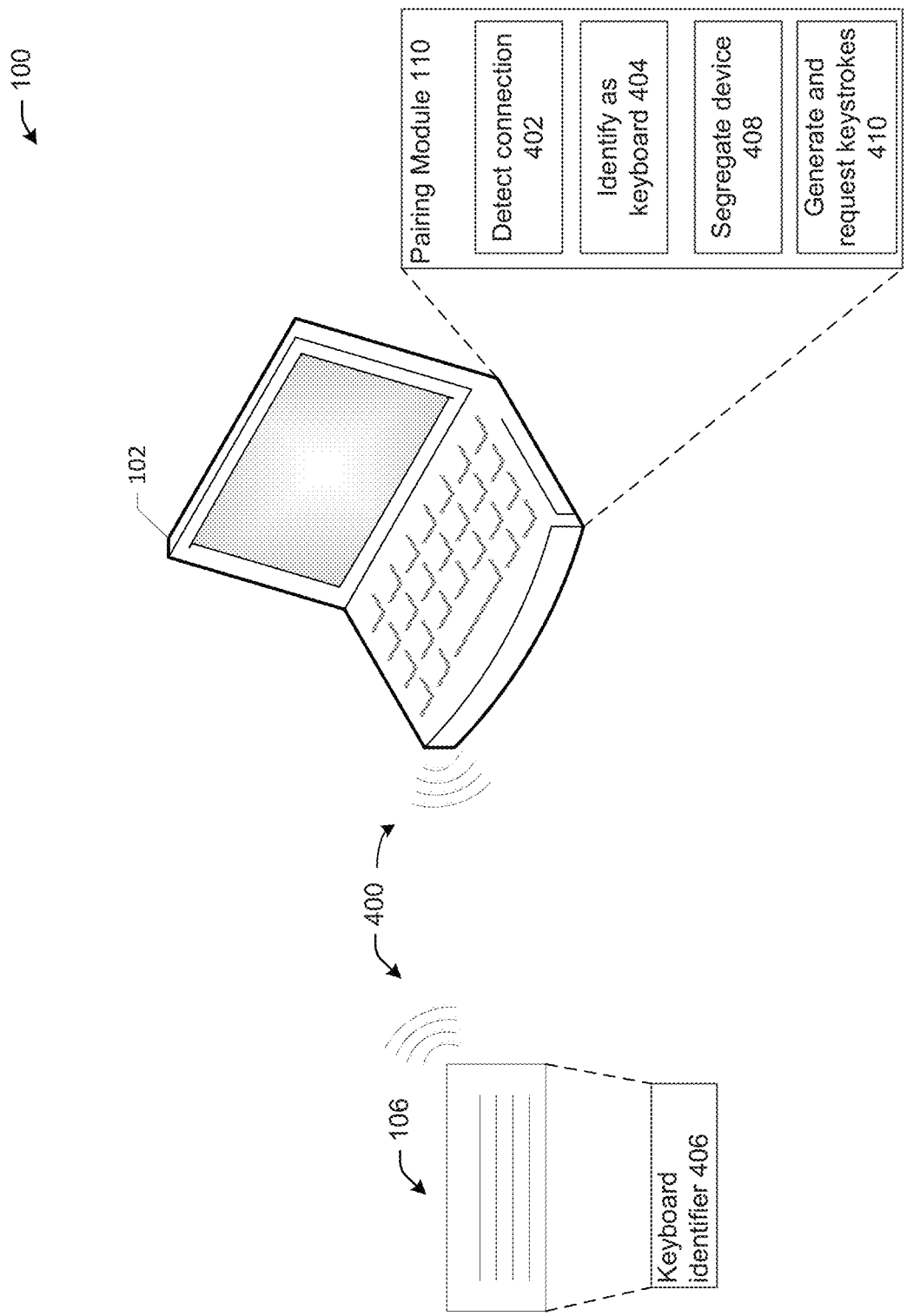
FIGS. 4 and 5 are schematic diagrams depicting connection of a keyboard to the computer of FIG. 1 in accordance with an embodiment of the disclosure.
Figure 5:
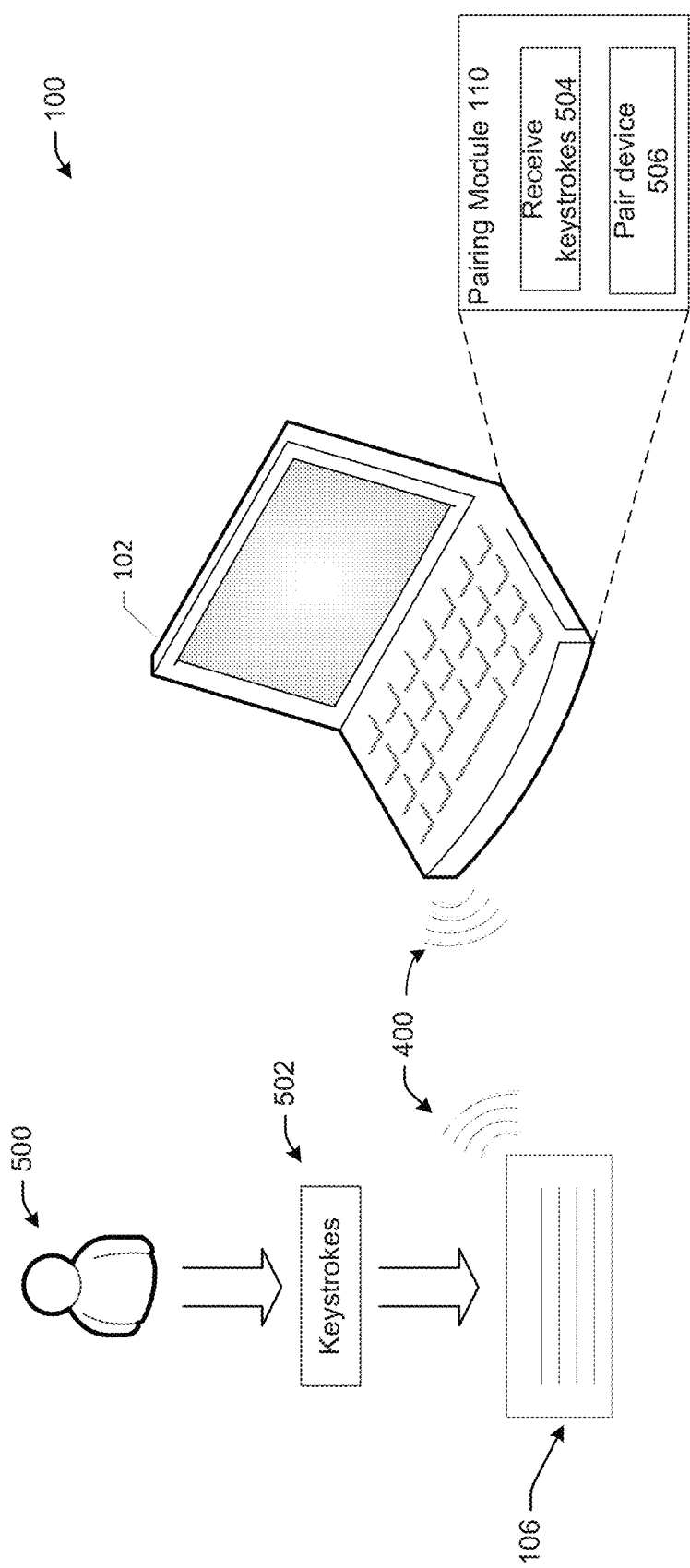

FIGS. 4 and 5 depict connection of the keyboard 106 to the computer 102 in accordance with an embodiment of the disclosure. As shown in FIG. 4, the keyboard 106 may be connected to the computer 102 via a wireless connection 400 (e.g., Bluetooth). In some embodiments, the wireless connection 400 may initiate a pairing process performed by the pairing module 110. In some embodiments, the pairing module 110 may implement, modify, or otherwise interact with an existing pairing process of a wireless interface (e.g., such as Bluetooth pairing).

Here again, the device pairing module may detect connection of the keyboard 106 (block 402) and identify the device as a keyboard (block 404) from a keyboard identifier 406 provided by the device. Because the keyboard 106 does not include any malware that misidentifies the device, the keyboard 106 may be identified by the computer 102 as a keyboard. The keyboard 106 may then be segregated from the resources of the computer 102 (block 408).

As shown in FIG. 4, after connection of the keyboard 106, a random user action based on the type of connected device (e.g., a sequence of keystrokes) to be received from the keyboard 106 may be generated and requested (block 410). A user may then enter the sequence of keystrokes to facilitate pairing of the keyboard 106 with the computer 102. For example, as shown in FIG. 5, a user 500 may enter the sequence of keystrokes 502 using the keyboard 106. The sequence of keystrokes 502 may be received as the requested random user action (block 504), and the keyboard 106 may be paired after the requested random user action is received (block 506). After pairing, the keyboard 106 may be usable with the computer 102 to control operations of the computer 102 and enter inputs. In contrast, for a keyboard having malware that misidentifies the device, a different random user action may be generated and requested and, thus, may be unable to be entered via the keyboard.

Figure 6:
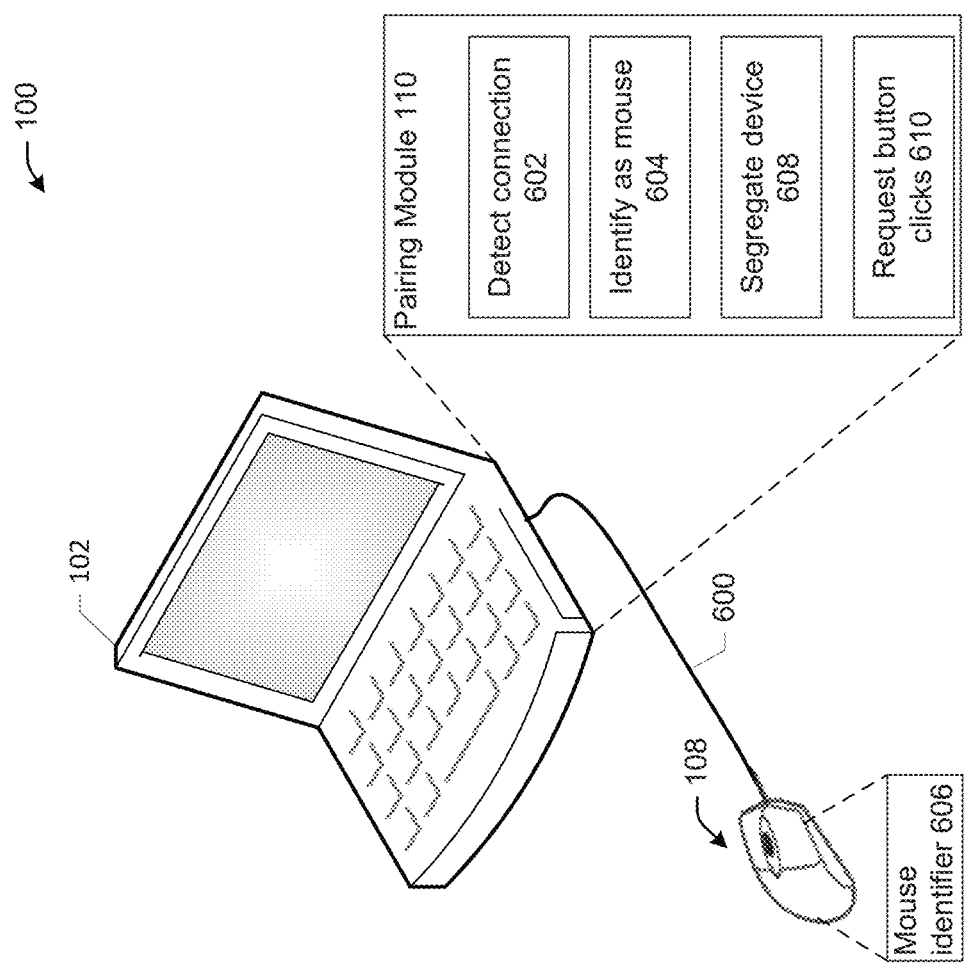
FIGS. 6 and 7 are schematic diagrams depicting connection of a mouse to the computer of FIG. 1 in accordance with an embodiment of the disclosure.
Figure 7:
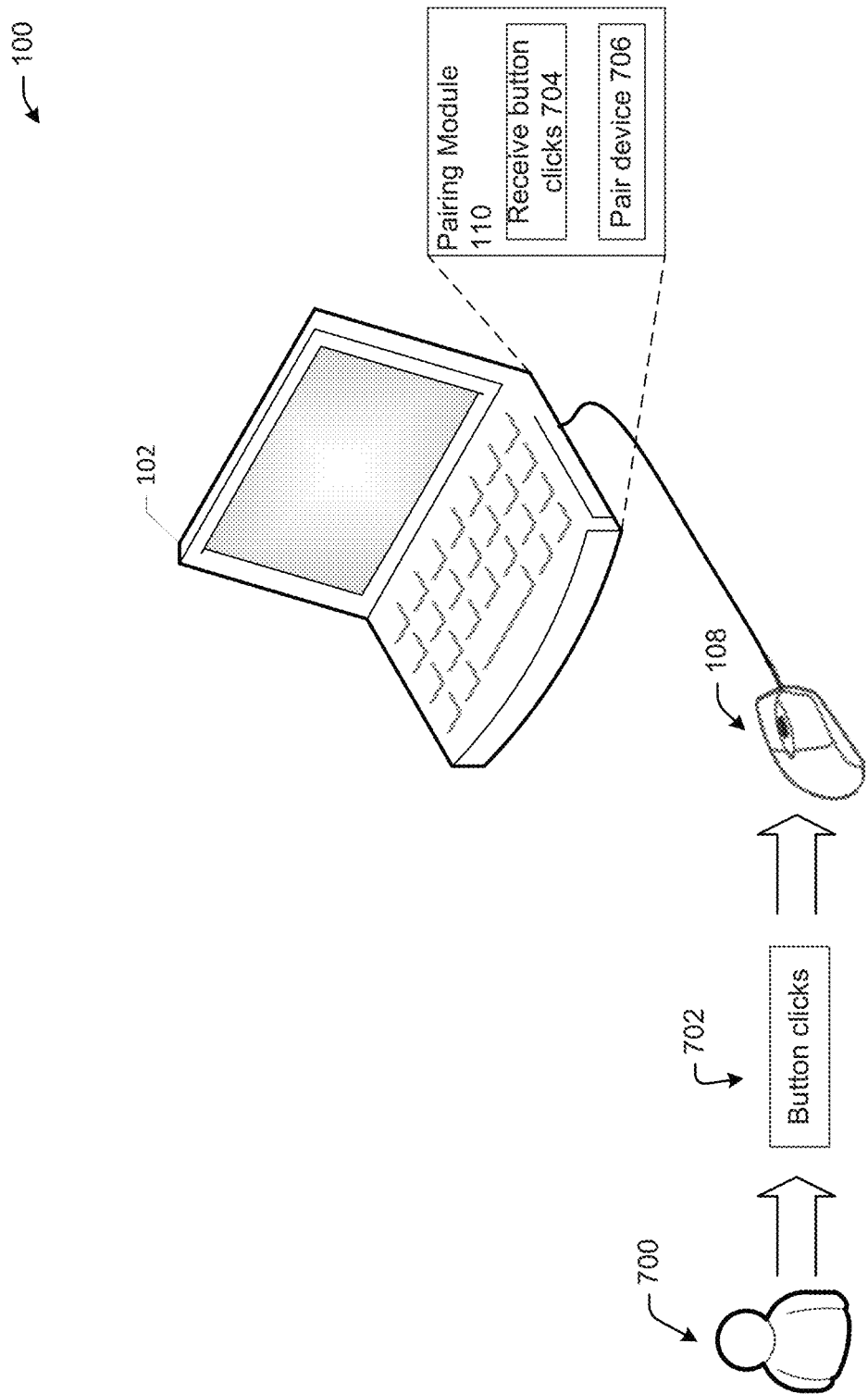

FIGS. 6 and 7 depict connection of the mouse 108 to the computer 102 in accordance with an embodiment of the disclosure. As shown in FIG. 6, the mouse 108 may be connected to the computer 102 via a wired connection 600 (e.g., via a USB interface). In some embodiments, the wired connection 600 may initiate a pairing process performed by the pairing module 110. The connection of the mouse 108 may be detected (block 602), and the connected device may be identified as a mouse (block 604) from a mouse identifier 606 provided by the device. Because the mouse 108 does not include any malware that misidentifies the device, the mouse 108 may be identified by the computer 102 as a mouse. The mouse 108 may be segregated from the resources of the computer 102 (block 608) until the pairing is completed in accordance with the techniques described herein.

As also shown in FIG. 6, a random user action based on the type of connected device (e.g., a sequence of button clicks) to be received from the mouse 108 may be generated and requested (block 610). To complete pairing of the mouse 108, a user may enter the random mouse input (e.g., the sequence of button clicks). For example, as shown in FIG. 7, a user 700 may enter button clicks 702 using the mouse 108. The button clicks 702 may be received as the requested user action (block 704), and the mouse may be paired with the computer 102 (block 706). After pairing, the mouse 108 may be usable with the computer 102 to control the operations of the computer 102 and enter inputs. In contrast, for a mouse having malware that misidentifies the device, a different random user action may be generated and requested and, thus, may be unable to be entered via the mouse.

Figure 8:
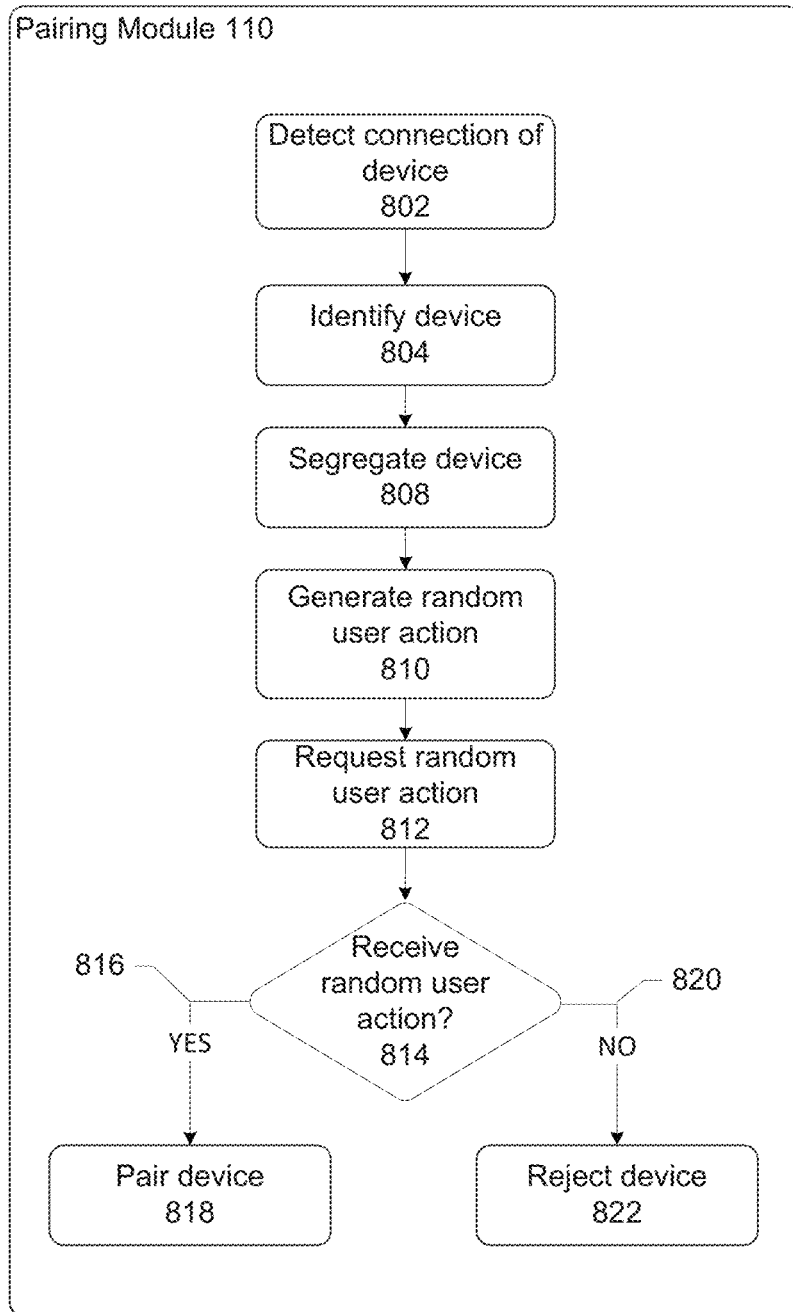
FIG. 8 is a block diagram of the operation of a pairing module in accordance with an embodiment of the disclosure.

With the foregoing examples in mind, FIG. 8 depicts a block diagram of operation of the pairing module 110 in accordance with an embodiment of the disclosure. As noted above, the pairing module 110 may be executable by one or more processors of the computer 102. Initially, the pairing module 110 may detect connection of a device (block 802). In some embodiments, as described above and as shown in FIGS. 3 and 7, a device may be connected to the computer 102 via a wired interface. In some embodiments, as described above and as shown in FIG. 5, a device may be connected to the computer 102 via a wireless interface.

Next, the pairing module 110 may identify the device (block 804). For example, in the examples illustrated in FIGS. 1-7, the device may be identified as a flash drive, a keyboard, or a mouse. In some embodiments, identifying a device may include identifying a flash drive, a mouse, a keyboard, a camera (e.g., webcam), a microphone, a gaming controller (e.g., gamepads, joysticks, etc.), a trackball, a foot pedal, a head-mounted display, a portable hard drive, a portable DVD drive, a printer, a scanner, an all-in-one, or other suitable device.

The pairing module 110 may then segregate the device from resources of the computer 102. For example, until the pairing is complete, the connected device may be unable to access any resources of the computer 102 other than the pairing module 110. Examples of such resources may include resources of the operating system executed on the computer 102, hardware of the computer 102, other applications executing on the computer 102, and so on. Next, a random user action may generated (block 810) based on the identified device. The random user action may include a suitable user action that may be performed using the identified device. For example, for a keyboard, a random user action may include a sequence of keystrokes. In another example, a random user action for a mouse may include a sequence of button clicks.

Next, the pairing module 110 may request the random user action (block 812). For example, in some embodiments the random user action 110 may be requested via a visual notification requesting performance (e.g., via text instructions or graphical instructions) of the random user action and provided on a display device associated with the computer 102. In some embodiments, the request may include a specified time period for a user to perform the random user action. In some embodiment, other types of notification, such as audio notifications, may be provided via an audio device of the computer 102.

The pairing module 110 may then determine whether the random user action is received (block 814). For example, if the random user action is a sequence of keystrokes, the random user action may be received after a user types the keystrokes on the connected device. If the random user action is received (line 816), the connected device may be paired with the computer 102 (block 818). The pairing may include granting access to the resources of the computer 102 unavailable to the previously segregated device. If the random user action is not received (line 820), the pairing module 110 may reject the connected device (block 822) and continue to segregate the device from resources of the computer 102, such that the connected device is not paired with the computer 102. In some embodiments, the device may be rejected if the pairing module 110 does not receive the requested user action in a time period (or if the pairing module 110 receives a cancellation of the pairing from a user). In some embodiments, the pairing module 110 may reject the connected device if a different user action is received that does not match the requested random user action, e.g., if keystrokes received from a connected device do not match a sequence of requested keystrokes.

Figure 9:
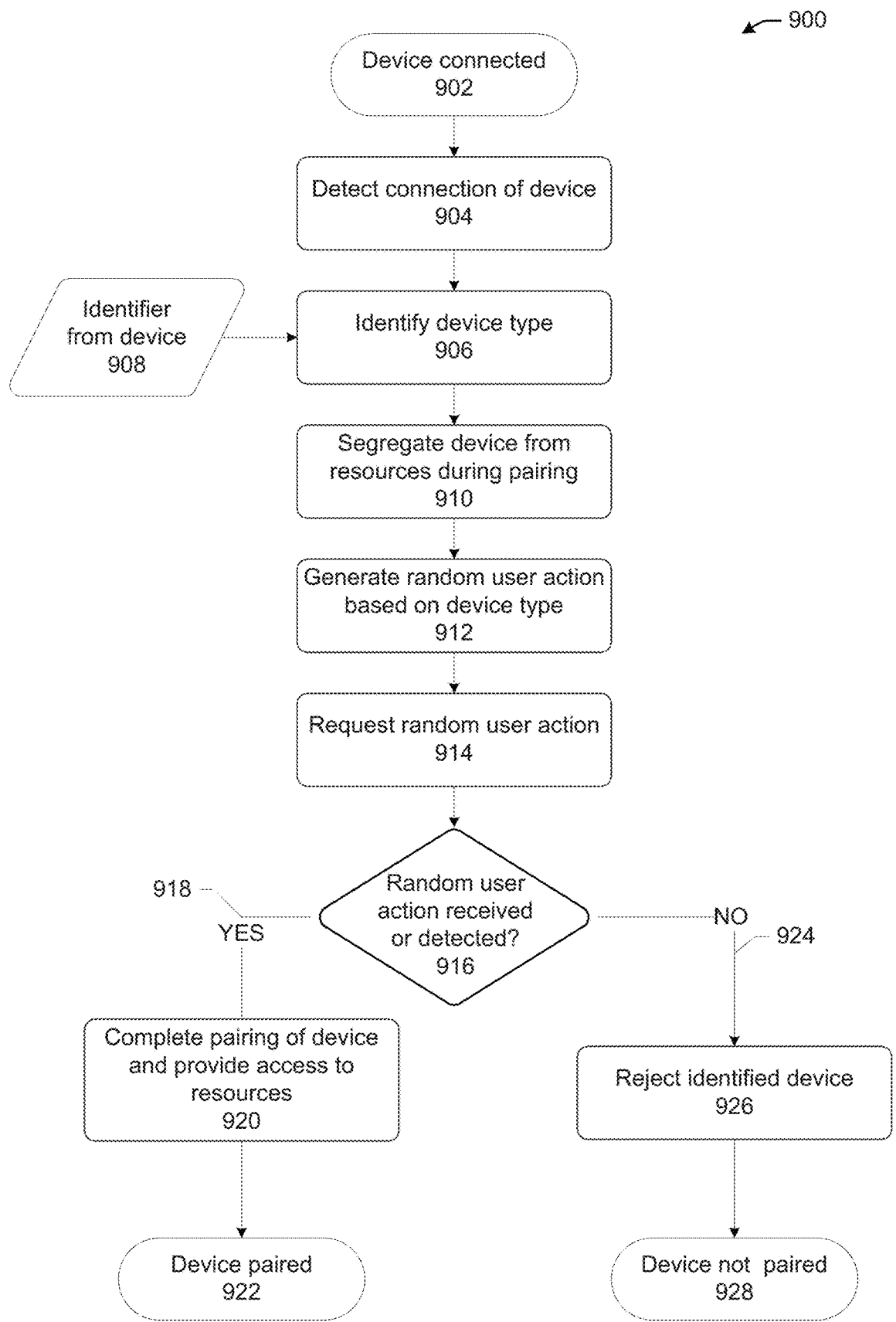
FIG. 9 is a block diagram of a process for pairing an external device using random user actions in accordance with an embodiment of the disclosure.

FIG. 9 depicts a process 900 for pairing an external device using random user actions in accordance with an embodiment of the disclosure. In some embodiments, the process 900 may be a part of or replace an existing pairing process provided by an interface technology (e.g., Bluetooth pairing). However, in contrast to Bluetooth pairing, the pairing described herein is based on the provided identification of a connected external device and a random user action generated based on the type of device.

The process 900 may initiate upon connection of an external device to a computer (block 902). As mentioned above, the connection may be via a wired connection or a wireless connection using a suitable wired or wireless interface respectively. Such interfaces may include, for example, universal serial bus (USB), Firewire (IEEE-1394), Thunderbolt, Lighting, Dockport, or other suitable interfaces. In some embodiments, interfaces may include networking interfaces using wired Ethernet, wireless Ethernet (Wi-Fi), or other technologies. In some embodiments, wireless interfaces may include Bluetooth, Near Field Communication (NFC), or other suitable wireless interfaces.

The connection of the device may be detected (block 904). The type of device may be identified (block 906) from a device identifier 908 provided by the device. For example, in some embodiments, a device may include a memory storing firmware, a device identifier, or both. In some embodiments, a device identifier may include an identifier of the manufacturer of the device. In some embodiments, the device identifier may be a hexadecimal number stored on the external device.

The device may be segregated from resources of the computer during pairing (block 910). In some embodiments, segregating the external device may include sandboxing the external device. Such resources may include resources of the operating system executed on a computer, hardware of a computer, other applications executing on a computer, and so on. For example, in some embodiments, the connected device may only interact with a pairing module of a computer and may not have access to any other resources of the computer.

Next, a random user action to be performed by the device may be generated based at least in part on the device type (block 912). A user action may be generated for each connection that initiates the process 900, and each user action may be randomized such that generated user actions are not reused. In some embodiments, each generated random user action may be stored for a time period such that the same random user action is not generated during the time period. In such embodiments, a generated random user action may be checked against a stored list of prior random user actions to determine whether the generated random user action has previously been used. If the generated random user action is not in the stored list, the random user action may be used to pair an external device. If the generated random user action is in the stored list, the generated random user action may be discarded and another random user action may generated. The next generated random user action may be checked against the stored list of prior random user actions until an unused random user action is generated.

Each device type may have one or more types of random user actions associated with it. In some embodiments, as mentioned above, a device type is determined form a device identifier provided by a connected external device. After the device type is determined, the random user actions for that device type may be determined. In some embodiments, a device type may have one type of random user action associated with it (e.g., keystrokes for a keyboard). In some embodiments, a device type may have multiple random user actions associated with it (e.g., button clicks for a mouse, rotation of a mouse wheel, etc.). If a device type has multiple types of random user actions associated with it, one of the random user action types may be selected and a random user action generated for the selected type. In some embodiments, selection of a type of random user action for a device type may be based at least in part on prior selected random user action types, the manufacture of a connected external device, the capabilities of a connected external device, other suitable factors or a combination thereof.

In some embodiments, a random user action may include an input entered using a device. In some embodiments, a random user action associated with a keyboard may include a single keystroke or multiple keystrokes (e.g., a sequence of keystrokes). In some embodiments, a random user action associated with a mouse may include one button click, multiple button clicks (e.g., a sequence of button clicks), rotation of a mouse wheel, movement of a mouse, or any combination thereof. In some embodiments, a random user action associated with a trackball may include one button click, multiple button clicks (e.g., a sequence of button clicks), rotation of a trackball wheel, movement of a trackball, or any combination thereof. In some embodiments, a random user action associated with a game controller may include one button click, multiple button clicks (e.g., a sequence of button clicks), movement of an analog stick (e.g., a thumb stick or a joystick), or any combination thereof. In some embodiments, a random user action associated with a camera (e.g., a webcam) may be covering the camera lens, uncovering the camera lens (e.g., covering and uncovering the camera lens in a pattern), moving the camera, or any combination thereof. In some embodiments, a random user action associated with a microphone may include a sound (e.g., a spoken letter, a word, or a sequence or words, clapping, snapping) or combination of sounds. In other embodiments, for other device types having at least one button, the random user action may include one button click or multiple button clicks (e.g., a sequence of button clicks).

Next, the generated random user action may be requested (block 914). For example, in some embodiments, a visual notification having a request for the random user action may be provided on a display device associated with the computer. In some embodiments, the visual notification may include instructions (e.g., text instructions, graphical instructions, or both) instructing a user to perform the random user action. In some embodiments, the visual notification may convey a specified time period for a user to perform the random user action. A visual notification may include, for example, a pop-up window, a taskbar icon, a notification bar icon, or other visual element. In some embodiments, an audio notification may additionally or alternatively be provided via an audio output device associated with computer. In other embodiments, a text message (e.g., a Short Message Service (SMS) message) having the request or an email having the request may be sent to a user account associated with the external device, the computer, or both.

The process 900 may then determine whether the random user action is received or detected (decision block 916). In some embodiments, the process 900 may wait for a specified time period before determining that a random user action has not been received or detected. As noted above, the specific time period may be conveyed to a user via a visual notification. In some embodiments, the random user action is an input received from an external device (e.g., keystrokes, button clicks, etc.). In other embodiments, the random user action may be detected by monitoring a connected device for performance of the user action.

If the random user action is received or detected (line 918), the device pairing may be completed, and the device may have access to the resources of the computer (block 920). The process 900 may end with a paired device (block 922). The paired device may be used to interact with the resources of the computer and control the operation of the computer. For example, a keyboard or a mouse may be used to control an operating system and applications of a computer by entering or selecting commands and various inputs. In another example, a camera may be used to record video that may be transmitted or stored on the computer. In some embodiments, a visual notification may be provided on a display of the computer to indicate that the connected device is paired. In some embodiments, an audio notification may additionally or alternatively be provided.

If the random user action is not received or detected (line 924), the device may be rejected (block 926) such that no pairing occurs, and the device remains segregated. In some embodiments, the device may be rejected if the random user action is not received in the specified time period for performing the random user action (e.g., "timed out"). In some embodiments, the process 900 may be canceled by a user such that no random user action is received or detected. In some embodiments, the device may be rejected if a different random user action is received or detected. For example, if the random user action is a sequence of keystrokes and a different sequence of keystrokes is received from a connected device, the device may be rejected. In some embodiments, any combination of the above techniques for rejecting a connected device may be implemented.

If the connected device is rejected, the process 900 may end with the device not paired (block 928). The unpaired device may be unable to interact with the resources of and control the operation of the computer, thus preventing the computer from performing malicious actions that may be instructed by malware on the connected device. In some embodiments, a visual notification may be provided on a display of the computer to indicate that the connected device is not paired. In some embodiments, the visual notification may include a warning that the connected device may include malware. In some embodiments, an audio notification may additionally or alternatively be provided. In some embodiments, an external device may include multiple identifiers, and the process 900 may be performed for each received identifier. For example, a flash drive identified as a flash drive and a keyboard may be paired as a flash drive but rejected as a keyboard, ensuring that malicious software does not input commands using keyboard input.

Figure 10:
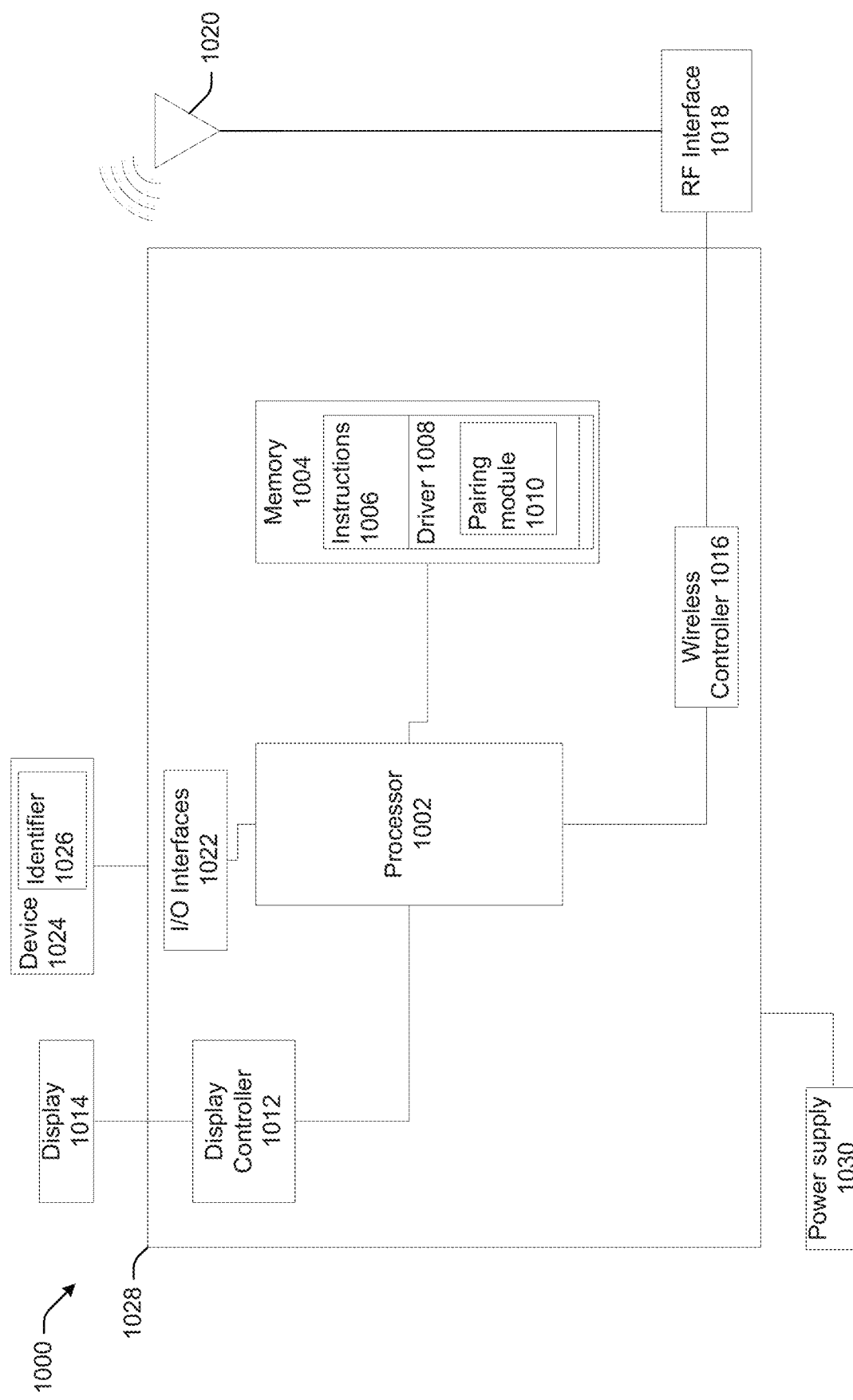
FIG. 10 is a block diagram of a computer in accordance with an embodiment of the disclosure.

FIG. 10 depicts a block diagram of an example embodiment of a computer 1000, such as any of the computers 102 of FIGS. 1-7 or otherwise referred to herein. The computer 1000 may include a server, a desktop computer, a laptop computer, a tablet computer, a smartphone, a personal digital assistant (PDA), a media player, a game console, a vehicle-mounted computer, or the like. The computer 1000 includes a processor 1002 and a non-transitory computer-readable medium (e.g., a memory 1004) coupled to the processor 1002. The memory 1004 may include instructions 1006 executable by the processor 1002.

The processor 1002 may provide the processing capability to execute the operating system, programs, user interface, and other functions of the computer 1000. The processor 1002 may include one or more processors and may include microprocessors, application-specific integrated circuits (ASICs), or any combination thereof. In some embodiments, the processor 1002 may include one or more reduced instruction set (RISC) processors, such as those implementing the Advanced RISC Machine (ARM) instruction set. Additionally, the processor 1002 may include single-core processors and multicore processors and may include graphics processors, video processors, and related chip sets. Multiple processors may be employed to provide for parallel or sequential execution of the techniques described herein. Processes, such as logic flows, described herein may be performed by the processor 1002 executing one or more computer programs to perform functions by operating on input data and generating corresponding output.

The memory 1004 (which may include one or more tangible non-transitory computer readable storage mediums) may include volatile memory and non-volatile memory accessible by the processor 1002 and other components of the computer 1000. The memory 1004 may store a variety of information and may be used for a variety of purposes. For example, the memory 1004 may store executable computer code, such as the firmware for the computer 1000, an operating system for the computer 1000, and any other programs or other executable code for providing functions of the computer 1000. The processor 1002 may be configured to or may execute the instructions 1006 to perform a pairing process for an external device using a random user action, as described in detail herein. The memory 1004 may store additional instructions, data, or a combination thereof. For example, the memory 1004 may store an interface driver 1008. In some embodiments, the interface driver 1008 may include a pairing module 1010 that performs a pairing process (e.g., the process 800 described above).

As mentioned above, the memory 1004 may include volatile memory, such as random access memory (RAM). The memory 1004 may also include non-volatile memory, such as read-only memory (ROM), flash memory, a hard drive, other suitable optical, magnetic, or solid-state storage mediums, or any combination thereof. The memory 1004 may store data files such as media (e.g., music and video files), software (e.g., for implementing functions on the computer 1000), user preference information, payment transaction information, wireless connection information, contact information (e.g., an address book), and any other suitable data.

FIG. 10 also shows a display controller 1012 that is coupled to the processor 1002 and to a display device, e.g., display 1014. In some embodiments, the display 1014 may include a liquid crystal display (LCD), an organic light-emitting diode (OLED) display, or other display types. In some embodiments, the display 1014 may include a touch-screen. The display 1014 may display a user interface (e.g., a graphical user interface) executed by the processor 1002 of the computer 1000. The display 1014 may also display various indicators to provide feedback to a user, such as power status, call status, memory status, network status etc. As described above, in some embodiments, the instructions 1006 may provide for the display of visual notifications on the display 1014 via the display controller 1012, such as when an external device is connected to the computer 1000.

FIG. 10 also indicates that a wireless controller 1016 can be coupled to the processor 1002, to a radio frequency (RF) interface 1018 (e.g., a transceiver), and to a wireless antenna 1020. In some embodiments, the wireless controller 1016 may implement any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-Max, or any other suitable communications standards, protocols, and technologies. FIG. 10 also depicts an input/output (I/O) interface 1022. The I/O interface 1022 may include multiple interfaces and may enable communication between various components of the computer 1000 and the processor 1002. The I/O interface 1022 may implement various types of interfaces, such as Peripheral Component Interconnect (PCI) interfaces, the Universal Serial Bus (USB) interfaces, Thunderbolt interfaces, Firewire (IEEE-1394) interfaces, and so on. The I/O interface 1022 may include a network interface that may communicate with networks, such as the Internet, an intranet, a cellular telephone network, a wide area network (WAN), a local area network (LAN), a metropolitan area network (MAN), or other networks. In some embodiments, such a network interface may implement Ethernet for network communications. FIG. 10 also depicts an external device 1024 coupled to the computer 1000. The external device 1024 may be physically coupled to the computer 1000 via a wired interface or may be wirelessly coupled to the computer 1000 via a wireless interface. The external device 1024 may include multiple devices and may include input devices, output devices, or input/output devices. In some embodiments, the external device 1024 may include a solid state drive (also referred to as a "flash drive") (e.g., a thumb drive), a keyboard, a mouse, a camera (e.g., a webcam), a microphone, a gaming controller (e.g., a gamepad, a joystick, etc.), a trackball, a foot pedal, a head-mounted display, a portable hard drive, a portable DVD drive, a printer, a scanner, an all-in-one, and other suitable devices. In some embodiments, the external device 1024 may include an identifier 1026 stored on a memory of the external device 1024. In some embodiments, the identifier 1026 may be provided by firmware stored on a memory of the external device 1024. The identifier 1026 may include an identification of the type of external device 1024, such as whether the external device 1024 is a keyboard, a mouse, a flash drive, and so on. In some embodiments, the identifier 1026 may include a manufacturer identifier, a product name, a product line, or any combination thereof.

In a particular embodiment, the processor 1002, the display controller 1012, the memory 1004, and the wireless controller 1016 are included in a system-in-package or system-on-chip device 1028. In a particular embodiment, a power supply 1030 is coupled to the system-on-chip device 1028. Moreover, in a particular embodiment, as illustrated in FIG. 10, the display 1014, the RF interface 1018, the wireless antenna 1020, and the power supply 1030 are external to the system-on-chip device 1028. However, each of the display 1014, the RF interface 1018, the wireless antenna 1020, and the power supply 1030 can be coupled to a component of the system-on-chip device 1028, such as an interface or a controller.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Further Embodiments

In a first example embodiment there is disclosed a method that includes detecting, by a processor, connection of an external device to a computer via a wired interface or a wireless interface and segregating, by the processor, the external device from one or more resources of the computer. The method also includes determining, by the processor and from an identifier provided by the external device, a type of the external device and generating, by the processor, a random user action based on the type of external device. The random user action includes an input receivable from the external device. The method further includes pairing, by the processor, the external device with the computer if the random user action is received from the external device, wherein pairing the external device includes providing the external device with access to the one or more resources of the computer.

In some embodiments, the method includes rejecting the external device if the random user action is not received from the external device. In some embodiments, rejecting the external device includes continuing to segregate the external device from the one or more resources. In some embodiments, the wired or wireless interface includes a universal serial bus (USB) interface. In some embodiments, the method includes requesting performance of the random user action in a time period and rejecting the external user device if the random user is not received within the time period, wherein rejecting the external device comprises continuing to segregate the external device from the one or more resources. In some embodiments, the external device includes a keyboard and the random user action includes one or more keystrokes. In some embodiments, the external device includes a mouse and the random user action includes one or more button clicks. In some embodiments, the external device includes a flash drive. In additional or alternative embodiments, the identifier identifies the flash drive as a keyboard. In some embodiments, the method further includes determining whether the random user action was previously used by comparing the random user action to a list of previously generated random user actions and storing the random user action in the list of previously generated random user actions if the random user action is not in the list. In some embodiments, the method further includes requesting the random user action via a display device associated with the computer.

In a second example embodiment there is disclosed a tangible non-transitory computer-readable medium. The tangible non-transitory computer-readable medium stores computer-executable instructions that, when executed by a processor, configure the processor to perform operations that include detecting, by a processor, connection of an external device to a computer via a wired interface or a wireless interface and segregating, by the processor, the external device from one or more resources of the computer. The tangible non-transitory computer-readable medium stores computer-executable instructions that, when executed by a processor, further configure the processor to perform operations that include determining, by the processor and from an identifier provided by the external device, a type of the external device and generating, by the processor, a random user action based on the type of external device. The random user action includes an input receivable from the external device. The tangible non-transitory computer-readable medium stores computer-executable instructions that, when executed by a processor, also configure the processor to perform operations that include pairing, by the processor, the external device with the computer if the random user action is received from the external device, wherein pairing the external device includes providing the external device with access to the one or more resources of the computer.

In some embodiments, the tangible non-transitory computer-readable medium stores computer-executable instructions that, when executed by a processor, configure the processor to perform operations that include rejecting the external device if the random user action is not received from the external device. In some embodiments, rejecting the external device includes continuing to segregate the external device from the one or more resources. In some embodiments, the wired or wireless interface includes a universal serial bus (USB) interface. In some embodiments, the tangible non-transitory computer-readable medium stores computer-executable instructions that, when executed by a processor, configure the processor to perform operations that include requesting performance of the random user action in a time period and rejecting the external user device if the random user is not received within the time period, such that rejecting the external device includes continuing to segregate the external device from the one or more resources. In some embodiments, the external device includes a keyboard and the random user action includes one or more keystrokes. In some embodiments, the external device includes a mouse and the random user action includes one or more button clicks. In some embodiments, the external device includes a flash drive. In additional or alternative embodiments, the identifier identifies the flash drive as a keyboard. In some embodiments, the tangible non-transitory computer-readable medium stores computer-executable instructions that, when executed by a processor, configure the processor to perform operations that include requesting the random user action via a display device associated with the computer.

In a third example embodiment, there is disclosed a device having a processor, an interface coupled to the processor, and a non-transitory computer-readable memory having stored thereon a pairing module. The interface may include a wired interface and a wireless interface. When executed by the processor, the pairing module causes the processor to perform operations that include detecting, by a processor, connection of an external device to a computer via a wired interface or a wireless interface and segregating, by the processor, the external device from one or more resources of the computer. When executed by the processor, the pairing module also causes the processor to perform operations that include determining, by the processor and from an identifier provided by the external device, a type of the external device and generating, by the processor, a random user action based on the type of external device. When executed by the processor, the pairing module also causes the processor to perform operations that include pairing, by the processor, the external device with the computer if the random user action is received from the external device, wherein pairing the external device includes providing the external device with access to the one or more resources of the computer.

In some embodiments, the pairing module, when executed by the processor, further causes the processor to perform operations that include rejecting the external device if the random user action is not received from the external device. In some embodiments, rejecting the external device includes continuing to segregate the second device from the one or more resources. In some embodiments, the wired or wireless interface includes a universal serial bus (USB) interface. In some embodiments, the external device includes a keyboard and the random user action includes one or more keystrokes. In some embodiments, the external device includes a mouse and the random user action includes one or more button clicks. In some embodiments, the external device includes a flash drive and the identifier identifies the flash drive as a keyboard. In additional or alternative embodiments, the identifier identifies the flash drive as a keyboard. In some embodiments, the pairing module, when executed by the processor, further causes the processor to perform operations that include providing, on a display device associated with the device, a visual notification requesting performance of the random user action.

In a fourth example embodiment, there is disclosed a method that includes detecting, by a processor, connection of an external device to a computer via a wired interface or a wireless interface and preventing, by the processor, the external device from accessing one or more resources of the computer. The method also includes requesting, by the processor, performance of a random user action in a time period and pairing, by the processor, the external device with the computer if the random user action is performed within the time period, wherein pairing the external device includes enabling access to the one or more resources of the computer by the external device.

In some embodiments, the method further includes rejecting the external device if the random user action is not performed within the time period. In some such embodiments, rejecting the external device includes continuing to prevent the external device from accessing one or more resources. In some embodiments, the external device includes a keyboard and the random user action includes one or more keystrokes. In some embodiments, he wired or wireless interface includes a universal serial bus (USB) interface. In some embodiments, the method also includes requesting, by the processor, performance of the random user action in a time period via a notification displayed on a display device associated with the computer. In some such embodiments, the notification includes the time period. In some embodiments, the method further includes generating the random user action, wherein the random user action is unique such that the random user action is different from previously generated random user actions.

In a fifth example embodiment, there is disclosed a tangible non-transitory computer-readable medium. The tangible non-transitory computer-readable medium stores computer-executable instructions that, when executed by a processor, configure the processor to perform operations that include detecting, by a processor, connection of an external device to a computer via a wired interface or a wireless interface and preventing, by the processor, the external device from accessing one or more resources of the computer. The tangible non-transitory computer-readable medium stores computer-executable instructions that, when executed by a processor, further configure the processor to perform operations that include requesting, by the processor, performance of a random user action in a time period and pairing, by the processor, the external device with the computer if the random user action is performed within the time period, wherein pairing the external device includes enabling access to the one or more resources of the computer by the external device.

In some embodiments, the tangible non-transitory computer-readable medium stores computer-executable instructions that, when executed by a processor, further configure the processor to perform operations that include rejecting the external device if the random user action is not performed within the time period. In some such embodiments, rejecting the external device includes continuing to prevent the external device from accessing one or more resources. In some embodiments, the external device includes a keyboard and the random user action includes one or more keystrokes. In some embodiments, he wired or wireless interface includes a universal serial bus (USB) interface. In some embodiments, the tangible non-transitory computer-readable medium stores computer-executable instructions that, when executed by a processor, further configure the processor to perform operations that include requesting, by the processor, performance of the random user action in a time period via a notification displayed on a displayed device associated with the computer. In some such embodiments, the notification includes the time period. In some embodiments, the tangible non-transitory computer-readable medium stores computer-executable instructions that, when executed by a processor, further configure the processor to perform operations that include generating the random user action, wherein the random user action is unique such that the random user action is different from previously generated random user actions.

In a sixth example embodiment, there is disclosed a device having means for detecting, by the processor, connection of a second device via a wired interface or a wireless interface and means for segregating, by the processor, the second device from one or more resources of the first device. The device further includes means for determining, by the processor and from an identifier provided by the second device, a type of the second device and means for generating, by the processor, a random user action based on the type of second device. The device also includes means for pairing, by the processor, the second device with the computer if the random user action is received from the second device, wherein pairing the second device includes providing the second device with access to the one or more resources of the computer.

In some embodiments, the device includes means for rejecting the external device if the random user action is not received from the external device. In some embodiments, the wired or wireless interface includes a universal serial bus (USB) interface. In some embodiments, the external device includes a keyboard and the random user action includes one or more keystrokes. In some embodiments, the external device includes a mouse and the random user action includes one or more button clicks. In some embodiments, the external device includes a flash drive. In additional or alternative embodiments, the identifier identifies the flash drive as a keyboard. In some embodiments, the device further includes means for providing, on a display device associated with the device a notification requesting performance of the random user action.

In a seventh example embodiment, there is disclosed a device having means for detecting, by a processor, connection of a second device to a computer via a wired interface or a wireless interface and means for preventing, by the processor, the second device from accessing one or more resources of the computer. The device also includes means for requesting, by the processor, performance of a random user action in a time period and means for pairing, by the processor, the second device with the computer if the random user action is performed within the time period, wherein pairing the second device includes enabling access to the one or more resources of the computer by the second device.

In some embodiments, the device further includes means for rejecting the second device if the random user action is not performed within the time period. In some such embodiments, rejecting the second device includes continuing to prevent the second device from accessing one or more resources. In some embodiments, the second device includes a keyboard and the random user action includes one or more keystrokes. In some embodiments, he wired or wireless interface includes a universal serial bus (USB) interface. In some embodiments, the device also includes means for requesting, by the processor, performance of the random user action in a time period via a notification displayed on a display device associated with the computer. In some such embodiments, the notification includes the time period. In some embodiments, the device further includes means for generating the random user action, wherein the random user action is unique such that the random user action is different from previously generated random user actions.

The invention claimed is:
1. A first device comprising:
at least one processor;
at least one of a wired interface or a wireless interface; and
memory including instructions that, when executed, cause the at least one processor to at least:
   restrict a second device connected to the at least one of the wired interface or the wireless interface from accessing a resource of the first device;
   generate a first requested user action based on a type of the second device;
   determine that the first requested user action is included in a list of previously generated user actions;
   generate, in response to the determination that the first requested user action is included in the list of previously generated user actions, a second requested user action, the second requested user action based on the type of the second device, the second requested user action not included in the list of previously generated user actions;
   request performance of the second requested user action in a time period; and
   when the second requested user action is received from the second device within the time period, pair the second device with the first device to provide the second device with access to the resource of the first device.

2. The first device of claim 1, wherein when the second requested user action is not received from the second device, the instructions further cause the at least one processor to reject the second device and continue to restrict the second device from accessing the resource.

3. The first device of claim 1, wherein the at least one processor is to cause a visual notification requesting performance of the second requested user action via a display associated with the first device.

4. The first device of claim 1, wherein the second device includes a keyboard and the second requested user action includes a sequence of keystrokes.

5. The first device of claim 1, wherein the second device includes a mouse and the second requested user action includes a sequence of button clicks.

6. The first device of claim 1, wherein the second device includes a flash drive identified as a keyboard.

7. The first device of claim 1, wherein the at least one processor is to, in response to the generation of the second requested user action, store the second requested user action in the list of previously generated user actions.

8. A tangible non-transitory computer-readable medium comprising computer-executable instructions that, when executed by at least one processor, cause the at least one processor to at least:
 restrict an external device from accessing a resource of the at least one processor;
 request performance of a first requested user input receivable from the external device based on a type of the external device;
 determine-that the first requested user input is included in a list of previously generated user inputs;
 request, in response to the determination that the first requested user input is included in the list of previously generated user inputs, performance of a second requested user input receivable from the external device, the second requested user input based on the type of the external device, the second requested user input not included in the list of previously generated user inputs; and
 in response to receipt of the second requested user input from the external device within a threshold time period, authorize the external device to access the resource of the at least one processor.

9. The tangible non-transitory computer-readable medium of claim 8, wherein the instructions, when executed, further cause the at least one processor to reject the external device and continue to restrict the external device from accessing the resource if the second requested user input is not received from the external device within the threshold time period.

10. The tangible non-transitory computer-readable medium of claim 9, wherein the instructions, when executed, further cause the at least one processor to request receipt of the second requested user input within the threshold time period.

11. The tangible non-transitory computer-readable medium of claim 8, wherein the external device includes a keyboard and the second requested user input includes a keystroke.

12. The tangible non-transitory computer-readable medium of claim 8, wherein the external device includes a mouse and the second requested user input includes a button click.

13. The tangible non-transitory computer-readable medium of claim 8, wherein the external device includes a flash drive identified as a keyboard.

14. The tangible non-transitory computer-readable medium of claim 8, wherein the instructions, when executed, further cause the at least one processor to store the second requested user input in the list of previously generated user inputs.

15. The tangible non-transitory computer-readable medium of claim 8, wherein the instructions, when executed, cause the at least one processor to cause a display device to display a request for the second requested user input.

16. A method for pairing an external device to a computer, the method comprising:
 restricting, by executing an instruction with at least one processor, the external device from accessing a resource of the computer;
 requesting, by executing an instruction with the at least one processor, performance of a first requested user input receivable from the external device based on a type of the external device;
 determining, by executing an instruction with the at least one processor, that the first requested user input is included in a list of previously generated user inputs;
 requesting, by executing an instruction with the at least one processor and in response to the determination that the first requested user input is included in the list of previously generated user inputs, performance of a second requested user input receivable from the external device, the second requested user input based on the type of the external device, the second requested user input not included in the list of previously generated user inputs; and
 in response to receipt of the second requested user input from the external device within a threshold time period, authorizing the external device to access the resource.

17. The method of claim 16, further including rejecting the external device and continuing to restrict the external device from accessing the resource if the second requested user input is not received from the external device within the threshold time period.

18. The method of claim 16, further including requesting receipt of the second requested user input within the threshold time period.

19. The method of claim 16, wherein the external device includes a keyboard and the second requested user input includes a keystroke.

20. The method of claim 16, wherein the external device includes a mouse and the second requested user input includes a button click.

21. The method of claim 16, wherein when the external device includes a flash drive identified as a keyboard, the second requested user input includes one or more simulated keystrokes.

* * * * *